[19] United States Patent
Heikkinen

[11] Patent Number: 4,826,013
[45] Date of Patent: May 2, 1989

[54] COLLECTION APPARATUS

[75] Inventor: Dale W. Heikkinen, Prentice, Wis.

[73] Assignee: Multitek, Inc., Prentice, Wis.

[21] Appl. No.: 75,578

[22] Filed: Jul. 20, 1987

[51] Int. Cl.$^4$ .......................... B65D 90/02; B65F 1/04
[52] U.S. Cl. .................................... 206/518; 206/520;
220/1 T; 220/22.3; 220/22.4
[58] Field of Search ................ 206/505, 515, 518–520;
220/1 T, 22, 22.1, 22.3, 22.4; 414/413, 419–421,
425

[56] References Cited

U.S. PATENT DOCUMENTS

| 992,006 | 5/1911 | Kubersky et al. | |
| 1,139,436 | 5/1915 | Netter . | |
| 1,191,589 | 7/1916 | Gutowski et al. | |
| 2,333,704 | 11/1943 | Cooper | 220/22.3 |
| 3,113,690 | 12/1963 | Swenck | 206/518 |
| 3,170,594 | 2/1965 | Nascher | 206/519 |
| 3,201,035 | 8/1965 | Martin et al. | |
| 3,202,346 | 8/1965 | Jacobs . | |
| 3,318,486 | 5/1967 | Felix | 206/518 |
| 3,346,271 | 10/1967 | Parsons | 206/515 |
| 3,486,648 | 12/1969 | De Wald | 414/420 |
| 3,613,924 | 10/1971 | Monson | 414/420 |
| 3,696,966 | 10/1972 | Herolzer | 206/518 |
| 3,701,443 | 10/1972 | Lely | 206/518 |
| 3,893,615 | 7/1975 | Johnson | 232/43.2 |
| 3,904,218 | 9/1975 | Kostic | 220/23.4 |
| 4,058,233 | 11/1977 | Frangos | 220/22 |
| 4,108,609 | 8/1978 | Petzinger | 220/1 T |
| 4,114,776 | 9/1978 | Pluss | 220/22 |
| 4,290,726 | 9/1981 | Sutela et al. | 414/421 |
| 4,545,523 | 10/1985 | Galbreath et al. | 232/43.1 |
| 4,673,327 | 6/1987 | Knapp | 414/421 |

FOREIGN PATENT DOCUMENTS

| 0683484 | 3/1964 | Canada | 206/518 |
| 1283701 | 8/1972 | United Kingdom | 414/420 |
| 1539372 | 1/1979 | United Kingdom | 206/518 |

Primary Examiner—Jimmy G. Foster
Attorney, Agent, or Firm—Jacobson and Johnson

[57] ABSTRACT

A stackable refuse container having removable dividers that can be removed for hauling and then locked in position at the pick up site to provide a multiple compartment refuse container and a method of hauling multiple stackable refuse containers using a trailer and conventional hooklift refuse hauling truck.

5 Claims, 7 Drawing Sheets

COLLECTION APPARATUS

FIELD OF THE INVENTION

This invention refers generally to collection apparatus and, more specifically, to stackable collection apparatus with removable dividers and a method of hauling multiple stackable containers to remote pickup sites.

BACKGROUND OF THE INVENTION

The transporting of empty refuse containers or containers for recyclable materials to a pickup location where the containers are filled with refuse is known in the art. Typically, after the refuse containers are full, the refuse hauler picks up the full container, hauls the refuse to a collection site and then returns the empty container to the pickup site. A prior art apparatus for loading a refuse container from the ground onto the back of the truck is shown in Sutela, et al. U.S. Pat. No. 4,290,726. The Sutela, et al. patent shows a truck with a hydraulic powered pivotal arm with a C-shaped hook that hooks onto the container to lift the container off the ground and onto the back of the truck. The container is then hauled to a collection site where the container is emptied. The present invention utilizes the available hook lift trucks and provides stackable containers for use on such trucks as well as providing a method for hauling multiple stackable containers to a remote pickup site.

DESCRIPTION OF THE PRIOR ART

The concept of receptacles with compartments for receiving waste material is old in the art. The Kubersky, et al. U.S. Pat. No. 992,006 shows a refuse receptacle having a plurality of transverse partitions with each compartment having a sliding closure to permit emptying of the compartments.

The Martin, et al. U.S. Pat. No. 3,201,035 shows stackable universal bins. The bins are stacked on top of each other in a mathematical progression so that the bins are locked together and can be filled with material from one side while parts are being taken out of the other side.

The Pluss U.S. Pat. No. 4,114,776 shows a container for collecting recyclable products, Pluss has partitions for dividing the container into multiple compartments. The bottom of his partitions are pivotable so as to permit removal of the refuse from the individual compartments.

The Galbreath, et al. U.S. Pat. No. 4,545,523 shows a waste material container for sludge which has sealed openings on the back and top of the container.

The Petizinger U.S. Pat. No. 4,108,609 shows a compost container with a top section for receiving waste and garbage and a base section for receiving the fertilizer sap from the top section.

The Johnson U.S. Pat. No. 3,893,615 shows a multiple refuse container that holds conventional garbage cans.

The Kostic U.S. Pat. No. 3,904,218 shows a multiple compartment trash container on rollers.

The Jacobs U.S. Pat. No. 3,202,346 shows a self-tamping waste receptacle.

The Netter U.S. Pat. No. 1,139,436 shows a ventilated garbage reservoir that holds garbage receptacles.

The Gotowski, et al. U.S. Pat. No. 1,191,589 shows a combination mail and milk box.

While the prior art is replete with the various types of refuse containers and hook lift trucks for transporting refuse containers from one site to another, the bulkiness and shape of the containers makes it difficult to haul more than one refuse container at a time. In most instances it would be more efficient if one unit could deposit empty refuse containers and another could haul the refuse to the collection site. Generally if one uses a truck and trailer, the most refuse containers that can be hauled to a pickup site in one trip are usually only two or three. If the pickup sites are in remote areas, the multiple trips greatly increase operator costs, capital costs, and fuel costs. While the nestable, stackable containers are known in the art, the present invention provides a nestable, stackable container which hauls removable dividers to permit the nestable, stackable containers to be stacked and hauled to a remote location. When at the remote location, the dividers can be installed in the containers to provide multiple compartments that permit selective emptying of the container compartment. The present invention also provides a method of transporting the stackable refuse containers to a site that eliminates the return trip from the dump site to the collection site by permitting a single hauling vehicle to haul, load, and unload multiple containers.

BRIEF DESCRIPTION OF THE INVENTION

Briefly, the invention comprises stackable refuse containers having removable partitions that can be removed for hauling and then locked in position at the pickup site to provide a divided refuse container and a method of hauling multiple stackable refuse containers using a trailer and conventional hook lift refuse hauling truck.

BRIEF DESCRIPTION OF THE DRAWINGS

FIG. 6 is a front view of a removable partition;

DESCRIPTION OF THE PREFERRED EMBODIMENT

Figure 1:
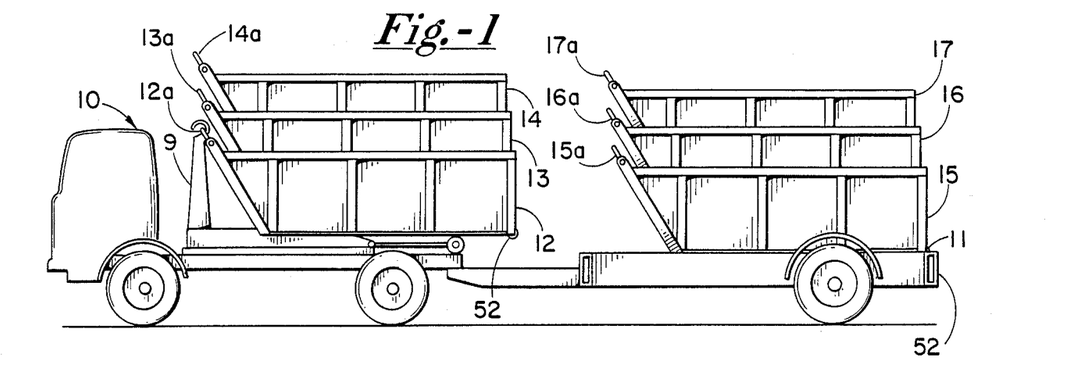
FIG. 1 is a side elevation view showing nestable containers mounted on the hook lift truck and trailer.

Referring to FIG. 1, reference numeral 10, designates a hook lift truck such as shown in U.S. Pat. No. 4,290,726. Located on the back of truck 10 are three stacked refuse containers 12, 13 and 14. Connected to truck 10 is a trailer 11 which also has three stacked refuse containers 15, 16 and 17 mounted thereon. The stackable refuse containers 12, 13, 14, 15, 16 and 17 are all identical in that the front end and the two sides of each refuse container slant outward while the rear end of the refuse container is vertical. The outward sloping arrangement for at least three sides permits one to stack the containers in a nesting relationship as shown in FIG. 1. That is, container 13 is nested in container 12 and container 14 is nested in container 13 and need not be separately fastened to truck 10 since nesting relationship of containers 13 and 14 with refuse container 12 holds refuse containers 13 and 14 during transportation of the containers. Similarly, container 17 nests in container 16 which nests in container 15. Container 15 is securely held on trailer 10 by a locking mechanism which prevents container 15 from sliding off during transportation. The advantage of the nesting arrangement is that during transportation, only the bottom refuse container need be secured to the truck or trailer.

The method of hauling multiple stacked refuse containers and dropping off a single refuse container at a remote site is illustrated by reference to FIGS. 1-4. FIG. 1 shows three identical stackable refuse containers 12, 13, and 14 stacked on the back of truck 10 and three identical stackable refuse containers 15, 16, and 17 stacked on trailer 11 for transportation to remote sites. Since usually only one of the refuse containers will be dropped off at a pickup site and the refuse containers are too heavy for a person to lift, I have found I can use the truck lifting mechanism 9 to remove and place a single refuse container at the pickup site.

Figure 2:
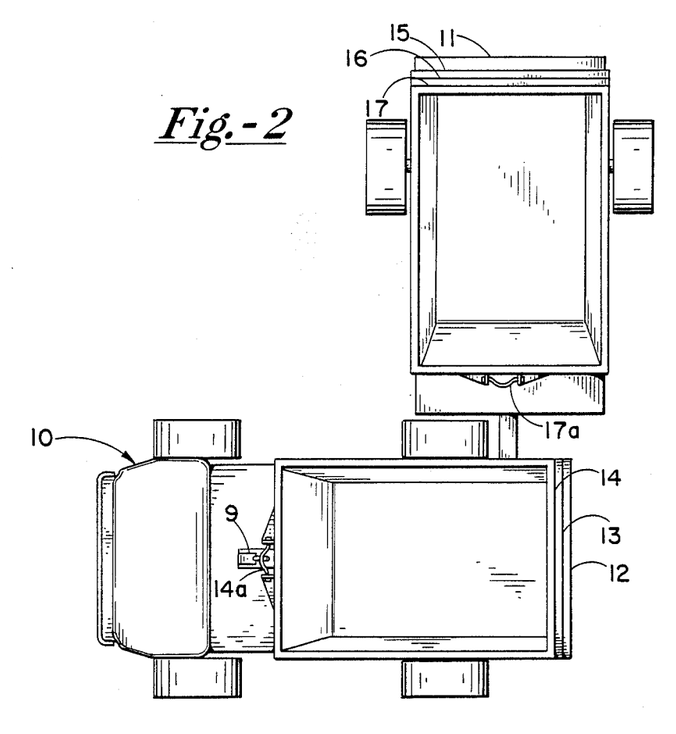
FIG. 2 is a top view showing stackable containers mounted on a truck and trailer.
Figure 3:
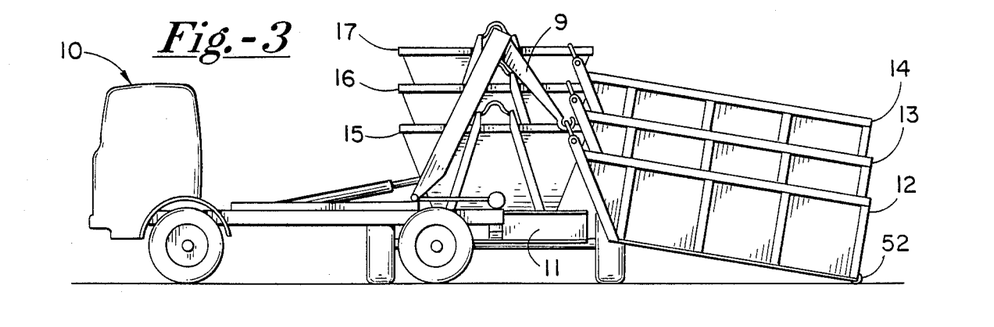
FIG. 3 is a side view showing stackable containers being unloaded from a truck.

The first step in removing a stackable refuse container from a truck and trailer is to back truck 10 and jackknife trailer 11 (FIG. 2). In the jackknifed position, trailer 11 is completely off to the side of truck 10. In the next step, (FIG. 3), the operator activates the truck hooklift mechanism 9 to simultaneously unload three stackable containers 12, 13, and 14 onto the ground. The back end of each of the refuse containers is vertical to prevent the top stackable containers 13 and 14 from sliding out of the lower stackable container 12 as container 12 is tilted backward during the unloading process. Located in the back of stackable container 12 is a roller 52 that permits the operator to roll refuse container 12 backward during the unloading process. Similarly, each of refuse containers has an identical roller located at the rear of the refuse container.

Figure 4:
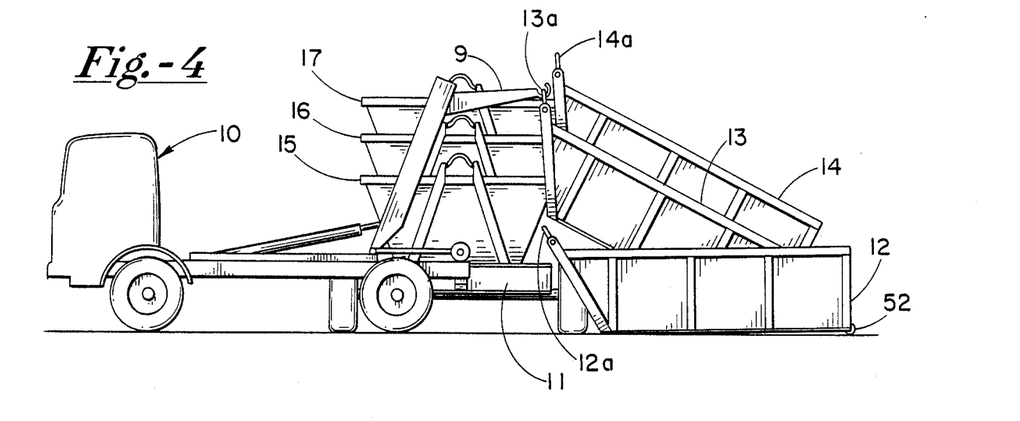
FIG. 4 is a side view showing stackable containers being unloaded from a truck.

Once the stacked containers 12, 13 and 14 are unloaded, the operator disconnects hook 9 from loop on lower stackable container 12 and connects hook 9 to loop 13a on middle stackable container 13 (FIG. 4). The operator then uses the hooklift mechanism 9 to lift stackable containers 13 and 14 onto the back of truck 10. Since the front and sides of the containers slope outward, the containers 13 and 14 can be unnested by merely lifting and pulling container 13 onto truck 10.

Figure 5:
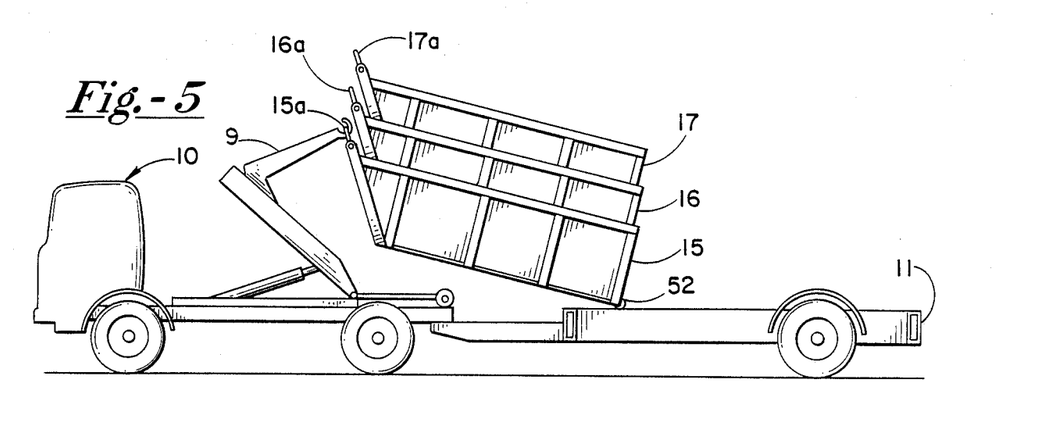
FIG. 5 is a side elevation view showing stackable containers being transferred from a trailer to a truck.

Once containers 13 and 14 are loaded, the operator drives to the next pickup site and repeats the unloading step with containers 13 and 14. After containers 12, 13 and 14 are unloaded, the operator loads containers 15, 16 and 17 on trailer 11 onto the back of truck 10 and repeats the process (FIG. 5).

After all the stackable containers are unloaded from the truck and trailer, the operator returns to the refuse site where he loads previously emptied stackable refuse containers onto trailer 11 and truck 10. To load stackable refuse containers onto trailer 11, the operator uses hooklift mechanism 9 to first load three stackable containers onto the back of truck 10. The hooklift mechanism 9 on truck 10 permits one to unload stackable containers from the truck directly onto trailer 11 or vice versa (FIG. 5). Once the stackable containers are loaded on the trailer, they are secured to trailer 11 through an electromechanical locking mechanism that can be operated from the truck 10.

Figure 6:
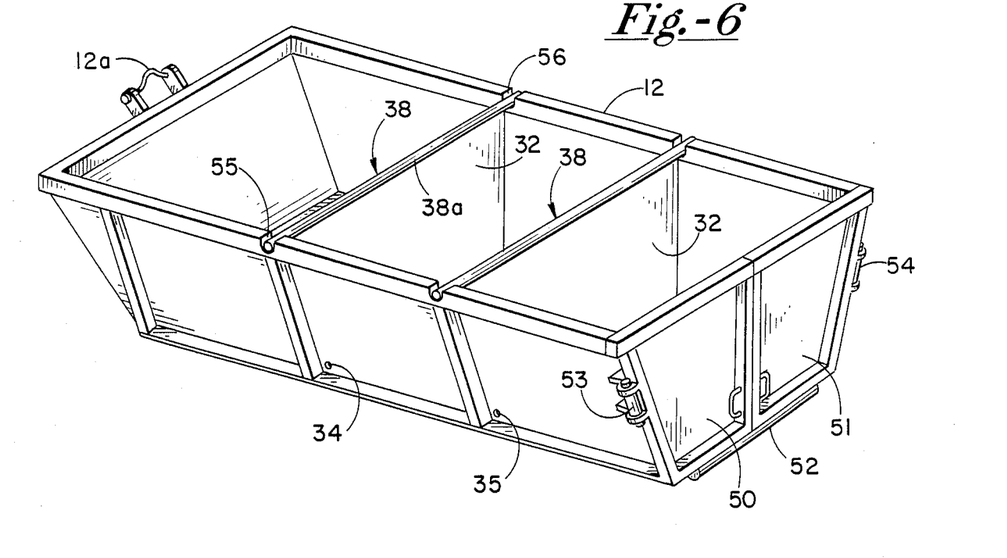
FIG. 6 is a pictorial view of a stackable container with removable partitions.

Referring to FIG. 6, stackable container 12 is shown in greater detail. Stackable container 12 comprises a front member having a loop 12a for engaging a hook. The back of container 12 includes a pivotal end gate 50 mounted to container 12 through hinge 53 and a pivotal end gate 51 mounted to container 12 through hinge 54. End gates 50 and 51 swing out to permit one to dump refuse from container 12. A locking mechanism (not shown) holds end gates 50 and 51 in the closed position until the unit is ready for dumping. Located in stackable container 12 are a pair of removable dividers 38. Located on one side of container 12 is an opening 34 for locking one side of dividers 38 into the vertical position. Similarly, the other side of container 12 includes an opening (not shown) for locking to the other side of divider 38 to container 12.

Figure 7:
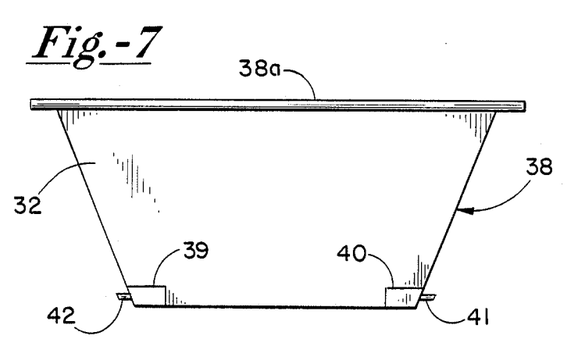
Figure 16:
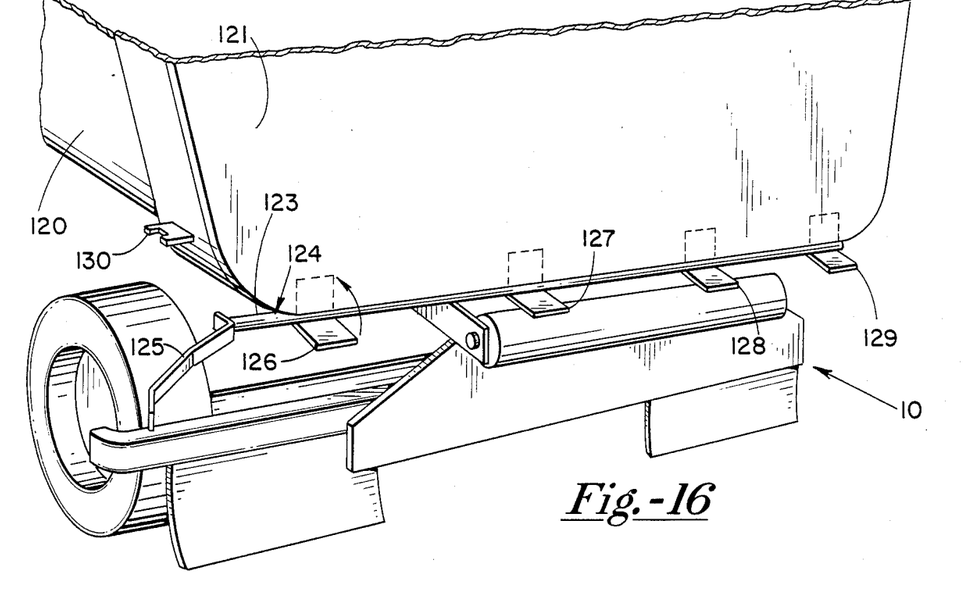
FIG. 16 is a view of the preferred embodiment of a partition holder and locking mechanism for a stackable container.
Figure 17:
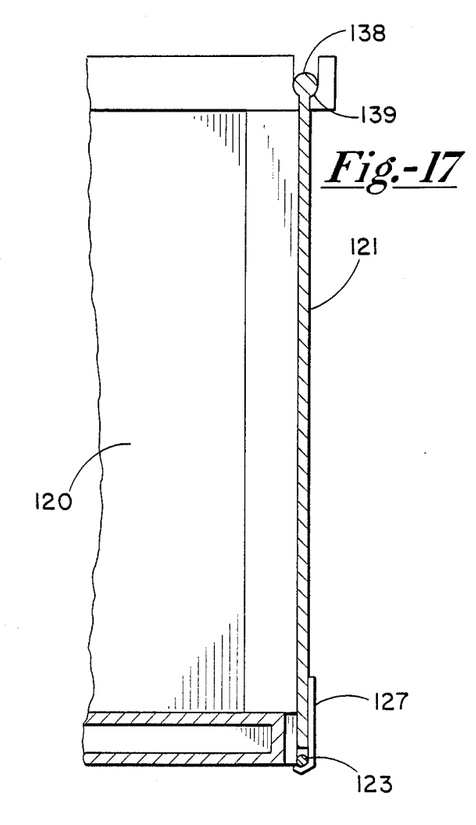
FIG. 17 is a sectional view showing the partition holder in the closed position.
Figure 18:
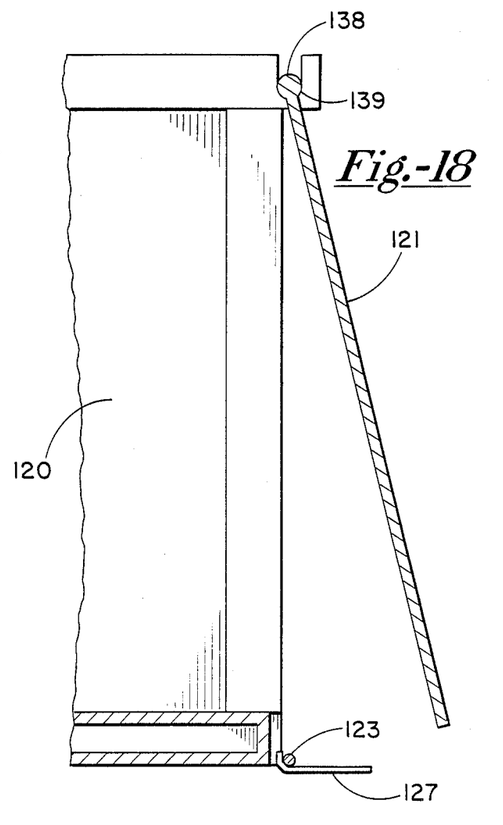
FIG. 18 is a sectional view showing the partition holder in an open position.

FIG. 7 shows divider 38 has a generally trapezoidal shape that mates with the interior of container 12. Located across the top of divider 38 is a pivot rod 38a which has one end that extends outward for engaging a U-shaped recess 55 in container 12 and another end that extends outward for engaging a U-shaped recess 56 in the other side of container 12. The rod 38a and recesses 56 and 55 permit insertion or removal of divider 38 from above. Rod 38a also permits divider 38 to pivot backward during unloading to permit emptying each of the compartments. Divider 38 is substantially flat and can be hauled in the bottom of the stackable container. Once at the site, the operator places the ends of pivot rod 38a in recesses 55 and 56 and locks divider 38 in container 12. The divider 38 is sufficiently light so that one person can install the divider. In order to lock divider 38 in place, a mechanical locking mechanism 39 and 40 is attached to the bottom of divider 38. (A further preferred locking mechanism is illustrated in FIGS. 16, 17 and 18.) A retractable locking pin 42 protrudes from locking member 39 and, similarly, a retractable locking pin 41 protrudes from member 40.

Figure 8:
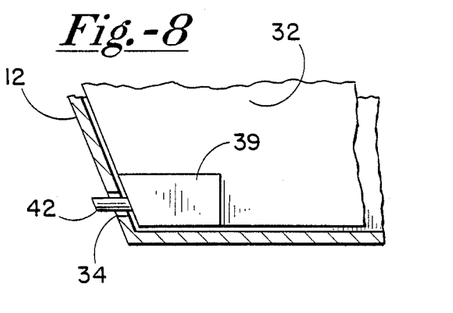
FIG. 8 is a sectional view of a locking mechanism for a removable partition.
Figure 9:
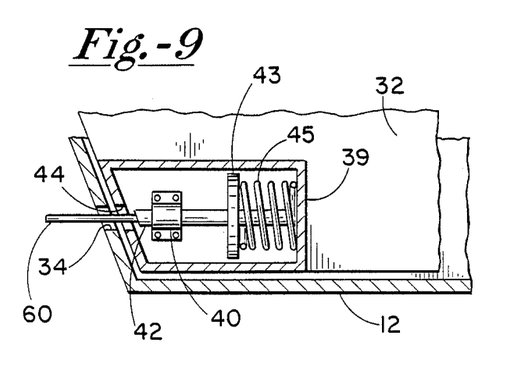
FIG. 9 is a sectional view of a locking mechanism for removable partition.

FIG. 8 shows a cutaway of container 12 with retractable pin 42 located in the extended or locking position in opening 34 on the side of container 12. In the extended position pin 42 securely holds the bottom divider 38 in the bottom of container 12. Pin 42 and rod 38a coact to prevent divider 38 from swinging or to prevent anyone from lifting divider 38 out of container 12. To illustrate how divider 38 can be removed, the locking mechanism is shown in the retracted position in FIG. 9. The cross-sectional view shows plate 38 with retractable pin 42 fastened to plate 32 through a bushing 40. Located in the rear portion of housing 39 is a compression spring 45 which produces a force that normally forces flange 43 and pin 42 outward. To force member 42 into the retracted position, as shown in FIG. 9, I insert a small diameter pushrod 60 into opening 35 to push retractable pin 42 backward into housing 39. Since the diameter of pushrod 60 is smaller than the diameter of retractable pin 42, one can swing divider 38 to produce misalignment of retractable pin 42 with opening 35. Next, the process is repeated on the opposite side with retractable pin 41. When the retractable pins are misaligned with the holes, they will slide over the sides of container 12 to permit either swinging or lifting divider 38.

Figure 10:
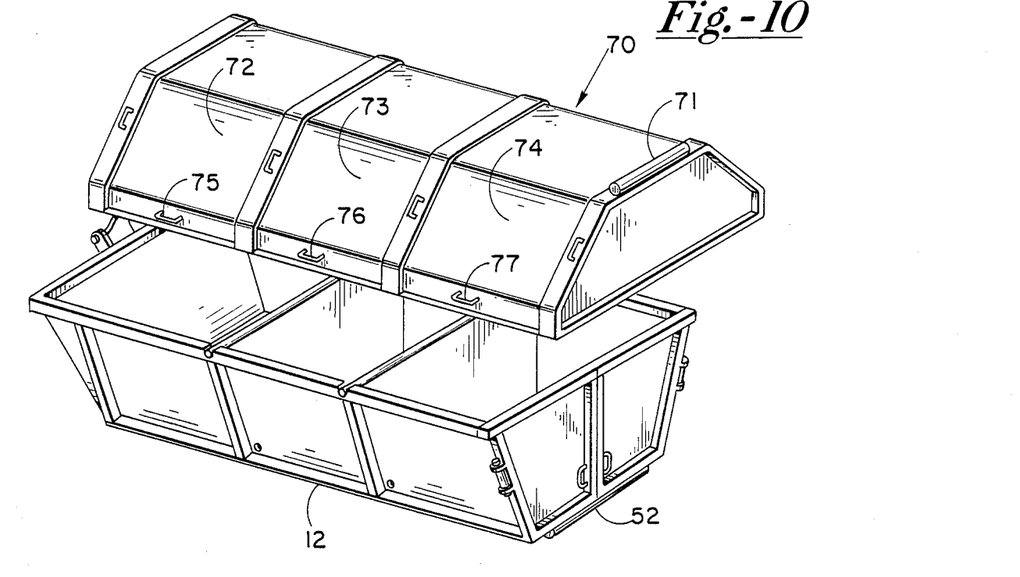
FIG. 10 is a veiw of a cover and a lower section of a reusable, stackable container.

FIG. 10 shows a stackable canopy 70 for use in the present invention. The stackable canopy 70 can either be left at the pickup location or the stackable canopys be inverted and stacked in a manner similar to refuse containers. FIG. 10 shows stackable canopy with a roller 71 to permit unloading of canopy 70. Similarly, a loop (not shown) is located on the opposite end of canopy 70 in the identical manner to container 12. Canopy 70 can be provided with a mating section for container 12 or pins can be used to hold canopy 70 on container 12.

Figure 11:
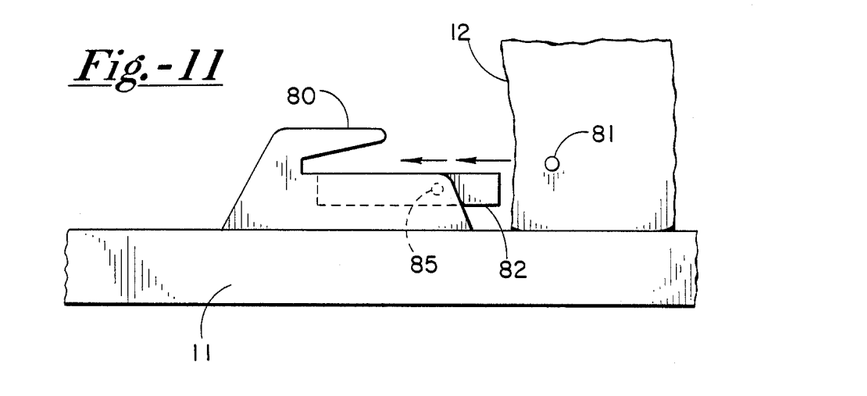
FIG. 11 is a view of the locking mechanism for the stackable containers.
Figure 12:
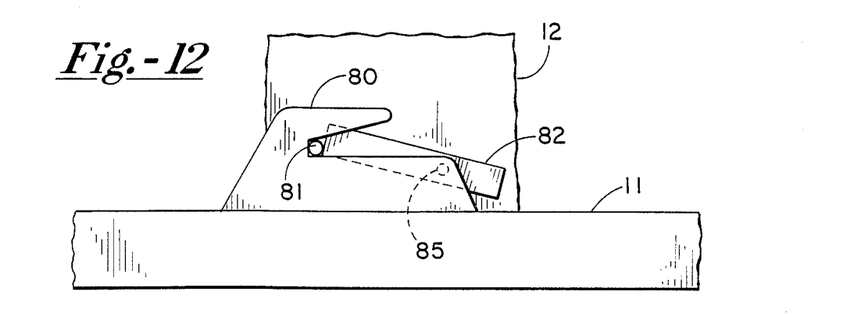
FIG. 12 is a view of the locking mechanism to maintain the container in a locked position.

One of the electromechanical locking mechanism for fastening a container to trailer 11 is shown in the unlocked position in FIG. 11 and in the locked position in FIG. 12. The locking mechanism comprises a hook-shaped member 80 for engaging a pin 81 that extends from the side of container 12. (FIG. 13) To fasten container 12 to trailer 11, one first tilts pivot arm 82 to the horizontal position. Next, one slides container 12 in the direction of arrow until pin 81 bottoms in hook 80. Next, one rotates pivot arm 82 in a clockwise direction until the end of pivot arm 82 closes the opening in hook 80 to prevent withdrawal of pin 81 and container 12. In order to provide alignment and holding action, I provide an identical locking mechanism on the opposite side of trailer 11.

Figure 13:
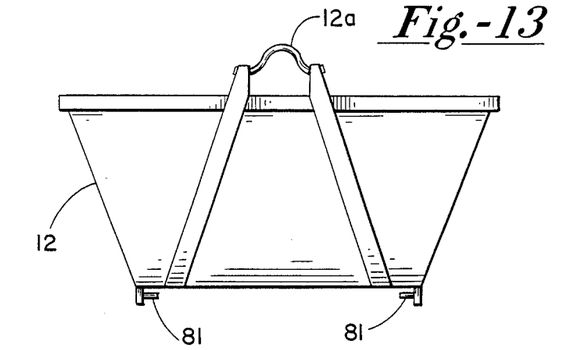
FIG. 13 is a front view of a stackable container.

FIG. 13 illustrates the location of the two pins 81 on the underside of container 12. The pivotal arm 82 is connected to a solenoid (not shown) which can rotate pivot arm 82 between the positions shown in FIG. 11 and FIG. 12. Thus, the operator can use the electrical system of the truck to lock or unlock the refuse containers to trailer 11.

Figure 14:
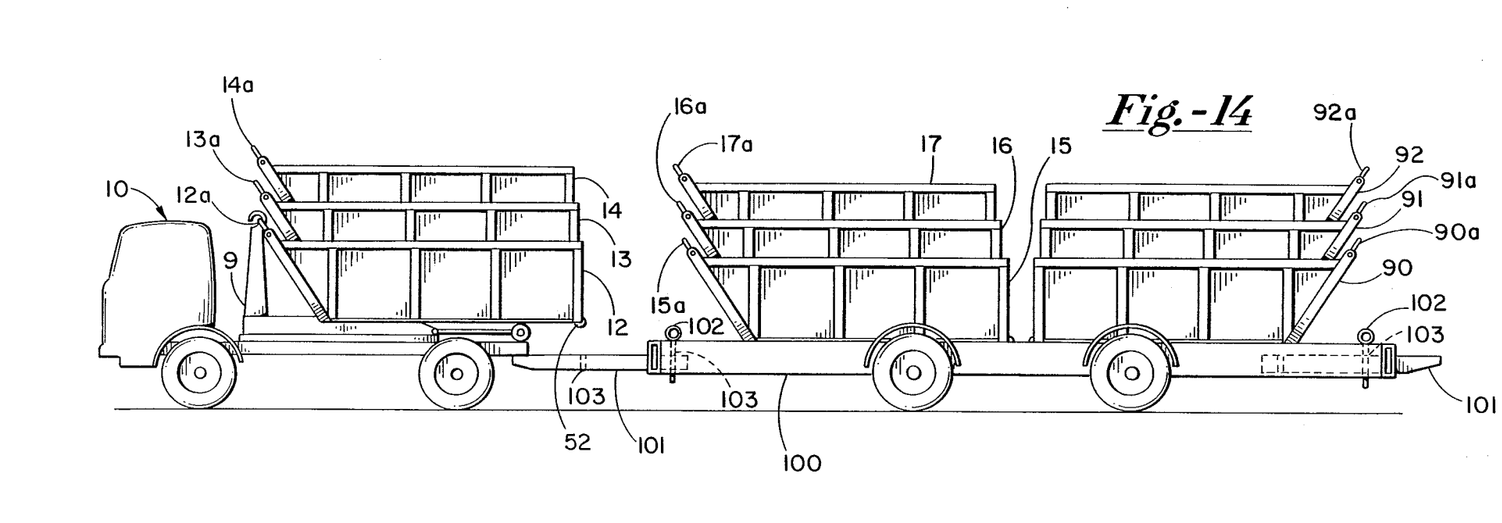
FIG. 14 is a side elevation view of a truck and stackable container, with the trailer having/either end hookup.
Figure 15:
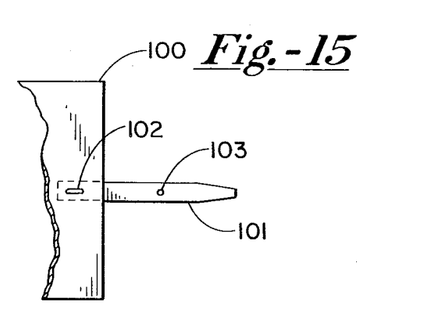
FIG. 15 is a top view of the hitch mechanism for a trailer.

Referring to FIG. 14, there is shown an alternate embodiment of the present invention. FIG. 14 shows a conventional hook lift truck 10 for unloading and loading nestable stackable refuse containers and a two way trailer 100 for hauling two sets of nestable stackable containers in an end-to-end relationship. Located on the left end of trailer 100 is a trailer tongue 101 which can be telescoped inward or outward. To lock trailer tongue 101 in position, one inserts a pin 102 through a hole 103 located in telescoping tongue 101 and trailer 100. FIG. 15 is a top view of telescoping tongue 101 with trailer tongue 101 in the extended position and pin 102 extending through tongue 101 and the trailer 100 to hold the tongue 101 in towing position. The trailer tongue on opposite ends of two way trailer 100 permit two way trailer 100 to be towed from either direction. FIG. 14 illustrates that trailer 100 permits hauling two sets of nestable stackable containers in an end-to-end relationship. To tow trailer 100 telescoping tongue 101 is extended to permit the operator to connect trailer 100 to truck 10. The tongue that is not being used to tow the trailer is retracted and pinned in the retracted position through pin 10. When the operator wishes to remove containers 90, 91 and 92, the operator retracts the left telescoping tongue 101 and extends the telescoping tongue 101 on the right side and places locking pin 102 into the proper hole 103 to lock tongue 101 in the extended position. The operator then connects trailer 100 to truck 10. In this condition the operator can attach truck 10 to trailer tongue 101 and then repeat the aforedescribed steps of backing up, loading and unloading of the nestable stackable containers 90, 91 and 92 with the loading and unloading unit on the conventional hook lift truck 10.

Referring to FIGS. 16, 17 and 18, the alternate preferred embodiments of a locking mechanism for holding the removable partitions in proper position. Reference numeral 121 identifies pivotal end gate and reference to numeral 120 identifies a nestable stackable container with removable partitions. Located on the rear of container 120 is a removable partition locking mechanism which comprises a pivotal rod 123 that is rotatably supported on the bottom of container by means not shown. Attached to pivotal rod 123 are a set of flat members 126, 127, 128 and 129. Connected to the end of rod 123 is a lever handle 125 made out of metal or the like which is used to rotate pivotal rod 123. In the position shown in FIG. 2, flat members 126, 127, 128 and 129 are in the release position to permit end gate 121 to pivot open. In the locked position lever handle 125 engages latch 130 to hold end gate 121 in a closed position. FIG. 17 is a cross-sectional view shows container 120 with pivotal end gate 121 which has a top cylindrical pivot member 138 that fits in a circular recess 139 in the top of container. In the locked position flat members 126, 127, 128 and 129 tightly hold gate 121 from opening (FIG. 17) In the release position (FIG. 18) gate 121 is free to pivot about the pivot rod 138 to allow material in the container 121 to be emptied. Although the mechanism for holding removable dividers or partitions is only shown in FIGS. 17 and 18 with regard to the rear compartment of container 120, however, identical removable dividers or partitions can be used in forward compartments to hold the removable dividers or partitions in position to allow for individual dumping of container 120. For example, if container 120 uses multiple compartments to hold multiple types of recycled material such as colored glass, paper, or plain glass the operator can back up to a location site, empty the first compartment located at the rear, then proceed to the next dump site and empty the contents of the second compartment and so on, until all of the separate compartments formed by the removable dividers or partitions container 120 are emptied.

It should be pointed out that nestable stackable containers 12, 13, 14, 15, 16, 17, 90, 91, 92 and 120 have means therein for supporting removable dividers or partitions but the detail of the holding mechanism and the locking mechanism are not shown in the schematic figures illustrating the loading and unloading of nestable stackable containers. It should also be pointed out that a horizontal divider can be extended between bottom container 12 and canopy 70 to provide both upper and lower compartments.

I claim:

1. A nestable stackable container with removable dividers for hauling refuse or reclyclable materials and the like comprising:
   a bottom section;

a pair of sidewalls extending upward from said bottom section, said sidewalls diverging outward from said bottom section, means in said sidewalls for pivotable attachment of a removable divider partition thereto;

a front end extending upward from said bottom section, said front end diverging outward from said bottom section;

an end section, said front end, said sidewalls, said end section and said bottom section defining a nestable stackable container that is stackable in a nestable relationship with another nestable stackable container, said end section extending vertically upward from said bottom section to form a stop for another nestable stackable container nested in said nestable stackable container; and a removable divider for insertion into said container to divide a compartment formed by said container into a plurality of compartments, said removable divider having a top side with a pivot rod extending across the top side and a bottom side with a divider locking mechanism to prevent said removable divider from tipping.

2. The invention of claim 1 wherein said means for pivotal attachment of said removable divider thereto includes recesses on said sidewalls of said stackable container and means to hold said removable divider in said container.

3. The invention of claim 1 wherein the divider locking mechanism includes a lever arm attached to a pivotal rod and members attached thereto for locking the dividers in said container.

4. The invention of claim 1 including a canopy for placing on top of said nestable container.

5. The invention of claim 1 including wherein said canopies are stackable within each other.

* * * * *